United States Patent [19]
Florent et al.

[11] Patent Number: 5,650,814
[45] Date of Patent: Jul. 22, 1997

[54] IMAGE PROCESSING SYSTEM COMPRISING FIXED CAMERAS AND A SYSTEM SIMULATING A MOBILE CAMERA

[75] Inventors: Raoul Florent, Valenton; Pierre Lelong, Nogent-Sur-Marne, both of France

[73] Assignee: U.S. Philips Corporation, New York, N.Y.

[21] Appl. No.: 326,629

[22] Filed: Oct. 19, 1994

[30] Foreign Application Priority Data

Oct. 20, 1993 [FR] France ................. 93 12503

[51] Int. Cl.$^6$ ................. H04N 7/18
[52] U.S. Cl. ................. 348/39; 348/36; 348/38
[58] Field of Search ................. 348/39, 36, 587, 348/586, 592, 38, 37

[56] References Cited

U.S. PATENT DOCUMENTS

| | | | |
|---|---|---|---|
| 5,187,571 | 2/1993 | Braun et al. | 358/85 |
| 5,200,818 | 4/1993 | Neta et al. | 348/39 |
| 5,329,316 | 7/1994 | Kang | 348/597 |
| 5,359,363 | 10/1994 | Kuban et al. | 348/36 |
| 5,440,348 | 8/1995 | Peters et al. | 348/582 |
| 5,444,478 | 8/1995 | Lelong et al. | 348/39 |

FOREIGN PATENT DOCUMENTS 9214341   8/1992   WIPO ................. H04N 7/15

OTHER PUBLICATIONS

"Boundary Value Problem of Image Modification" by N. Nakatani, Optical Engineering, vol. 31, No. 2, Fevrier 1992, pp. 280–286.

*Primary Examiner*—Tommy P. Chin
*Assistant Examiner*—Anand S. Rao
*Attorney, Agent, or Firm*—Bernard Franzblau

[57] ABSTRACT

System for processing digital images includes a system of n fixed real cameras whose individual fields of view merge for recording a panoramic scene. An image construction system simulates a mobile, virtual camera continuously scanning the panoramic scene (Iv) to furnish an arbitrary sub-image, referred to as a digital target image (Iv) constructed from adjacent source images of the real cameras. A luminance equalizing system includes modules which apply correction laws (Gi, Gj), respectively, to the sets (R and F(R)) of the corresponding luminance levels, in portions (Ivi, Ivj) of a digital target image (Iv) constructed from two adjacent digital source images (Ii, Ij) to equalize these corresponding levels in accordance with the relation $Gi(R)=Gj[F(R)]$.

19 Claims, 5 Drawing Sheets

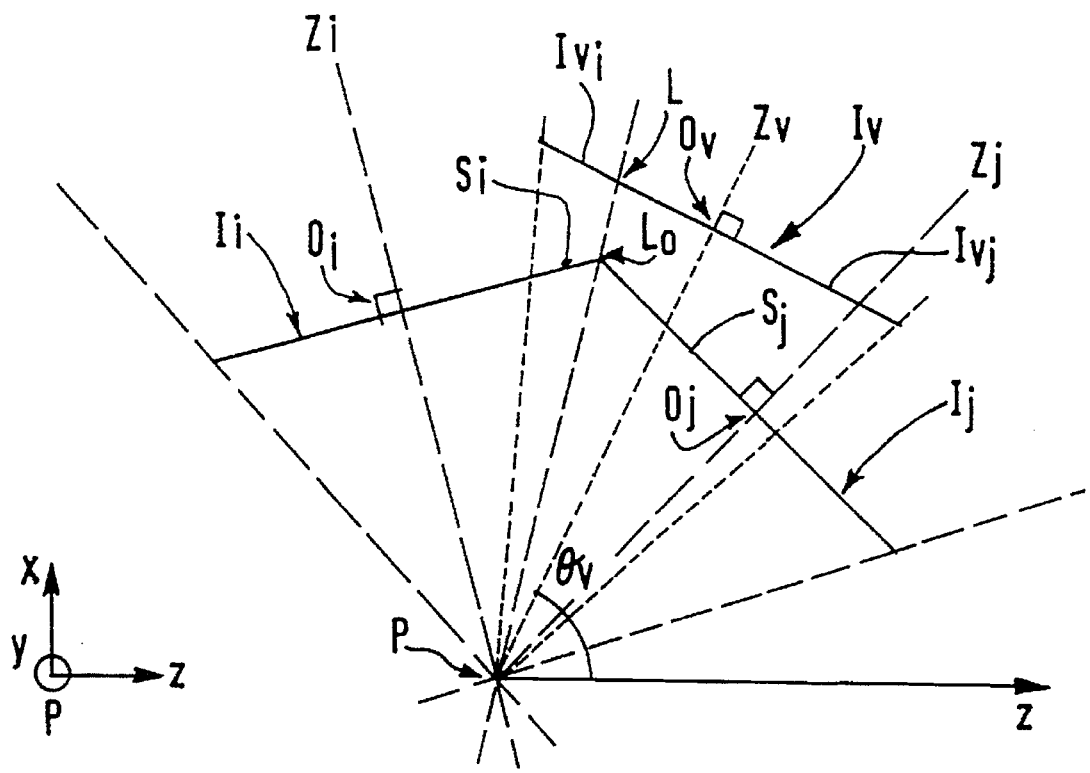
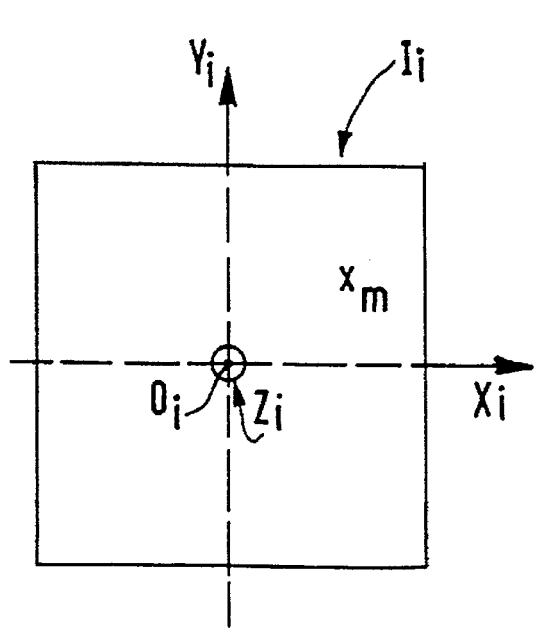
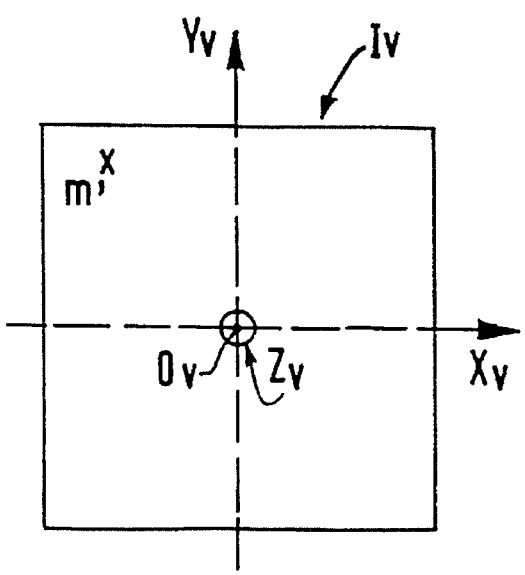
FIG.1B   FIG.1A
FIG.1C   FIG.1D

IMAGE PROCESSING SYSTEM COMPRISING FIXED CAMERAS AND A SYSTEM SIMULATING A MOBILE CAMERA

BACKGROUND OF THE INVENTION

1. Field of the Invention

This invention relates to an image processing system, comprising:
- a system of n fixed real cameras arranged in such a way that their individual fields of view merge so as to form a single wide-angle field of view for recording a panoramic scene;
- an image construction system simulating a mobile virtual camera continuously scanning the panoramic scene to furnish a target sub-image corresponding to an arbitrary section of the wide-angle field of view and constructed from adjacent source images furnished by the n real cameras.

This system is used in monitoring devices and in panoramic sighting devices for mobile engines.

2. Description of the Related Art

An image processing device is known from Patent Application WO 92-14341, corresponding to U.S. Pat. No. 5,187,571. This document describes an image processing system for television. This system comprises a transmitter station including a plurality of fixed cameras arranged adjacent to each other so that their fields of view merge and form a wide-angle field of view. This system also comprises a processing station including means for generating a composite video signal of the overall image corresponding to the wide-angle field of view, and means for selecting a sub-image from this composite image. This system also comprises means such as a monitor for displaying this sub-image. This sub-image corresponds to a field of view having an angle which is smaller than that of the composite image and is referred to as a sub-section of the wide-angle field of view.

This image processing system is only suitable for conventional television systems in which the image is formed line by line by means of a scanning beam.

The processing station enables a user to select the sub-section of the wide-angle field of view. The corresponding sub-image has the same dimension as the image furnished by an individual camera. The user selects this sub-image by varying the starting point of the scan with respect to the composite image corresponding to the wide-angle field of view. The wide-angle field of view has an axis which is parallel to the video scan, with the result that the starting point for the video scan of the sub-image may be displaced arbitrarily and continuously parallel to this axis.

The angle of the field of view to which the sub-image corresponds may be smaller than that of a real camera. However, the localization of the sub-image does not include a displacement perpendicular to the scan; its localization only includes displacements parallel to this scan. The formation of the sub-image does not include the zoom effect with respect to the composite image, i.e. the focal change of the sub-image with respect to the focal length of the image pick-up cameras.

The image processing station thus comprises means for constructing the selected video sub-image line after line. These means essentially include a circuit for controlling the synchronization of the video signals from the different cameras.

The present invention has for its object to solve the problem encountered when the constructed sub-image or target image is a digital image, and is computed from at least two portions of adjacent digital source images each furnished by a real fixed pick-up camera, these two cameras being arranged in such a way that their fields of view merge. In this case, a boundary line appears in the target image between the two adjacent target image portions computed from the two different source images. This is caused by the fact that each one of the two real cameras furnishes a source image which, overall, has a luminance which slightly differs from the luminance of the other source image, and that the resultant target image portions also have slightly different luminances.

This luminance difference between the two target image portions computed from the source images provided by the two adjacent cameras is the reason that the reconstructed target image is not perfect.

This boundary line is located between the picture elements computed from the picture elements of the source image of the first fixed camera, and the picture elements computed from the source image of the second fixed camera.

If the target image is constructed from the picture elements of more than two cameras, there will be as many boundary lines as there are groups of two adjacent cameras.

SUMMARY OF THE INVENTION

The present invention has for its object to provide means for equalizing the overall luminance between two adjacent digital image portions of a target image formed from digital source image portions furnished by the two real cameras whose fields of view merge.

The luminance difference between the two adjacent digital source images has several causes. Firstly, the real cameras do not respond in the same way to the same received luminous flux. This is due to the deviations in the structural features of the cameras. Furthermore, the cameras do not receive the same luminous flux since they are not identically arranged with respect to the light source of the recorded scene. Each pick-up camera is generally provided with a system for adapting its response as a function of the luminous flux received. As the luminous flux received differs from one camera to the other, the result is that their responses differ.

Moreover, even if each camera records a surface which as regards luminance is entirely uniform, the image it forms therefrom is not uniform, but causes vignetting. This is a change in the brightness of the image which generally decreases from the center towards the edges.

It appeared that two adjacent pixels, located at either side of the boundary line in the target image formed, do not originate from an area located at the same distance from the center of each original source image. Therefore, there is not the same vignetting effect in these adjacent pixels.

It may further happen that one of the pick-up cameras receives more stray light than the other—caused, for example, by an inopportune stray reflection—which also locally increases the flux received by this camera and then produces a local difference in the responses between the two cameras.

Of all these causes producing luminance differences between the two source images furnished by the two real digital cameras resulting in a difference in luminance on both sides of a boundary line in the digital image formed, it appears that said two first causes are predominant and that, basically, the annoying boundary line in the target image formed is caused by the fact that each one of the two adjacent real cameras does not overall receive the same quantity of luminous flux as the other, and/or that each one of the two cameras overall provides a different response to the same flux received.

The other causes may be disregarded, or else one can take precautions against them. For example, the stray reflections can be prevented by providing the camera with a sunshade.

It also appears that each one of the two predominant causes of the difference in luminance produces an overall effect, that is to say, the effect produced also holds uniformly for the source image from each real camera and then for the corresponding part in the target image produced.

If each one of the other causes of the luminance difference produces a local effect, vignetting, stray light zone etc., they may ultimately appear only in a small portion of the reconstructed image.

It is therefore an object of the present invention to provide means for causing the boundary line to disappear from the reconstructed target image, which fine appears between the two adjacent image portions computed from the source image picture elements supplied by the two real cameras whose fields of view merge.

According to the invention, this object is achieved by means of the image processing system defined in the opening paragraph and is characterized in that this processing system is entirely digital and that it further comprises:

a luminance equalizing system including first and second luminance correction modules (LUT.A, LUT.B), which apply a first and a second correction law (Gi, Gj), respectively, to the first and second sets (R,S) of the corresponding luminance levels of a first and a second portion (Ivi, Ivj) of a digital target image Iv formed from two adjacent digital source images (Ii, Ij), to equalize these corresponding luminance levels, in accordance with the condition Gi(R)=Gj(S).

Thus, according to the invention, a transform is made to an overall extent of, on the one hand, the different luminance levels of one of the two portions of the reconstructed target image, and, on the other hand, the different luminance levels of the other one of the two portions of the reconstructed image, employing the two laws of the overall transform of the luminance levels, so that the luminance levels of the corresponding pixels in the reconstructed target image are equalized.

Corresponding pixels are understood to mean pixels which are located at either side of the boundary line and which nevertheless correspond to two portions of the wide-angle field of view which would have the same luminance level if the image were formed by a single real camera.

At the end of such an overall treatment in accordance with a first and a second law applied to the respective luminance levels of the pixels of the first and second portions of the reconstructed image, at either side of the boundary line, it is, for example, achieved that if the first portion of the image has overall a low luminance level (dark image) and if the second portion of the image has overall a high luminance level (bright image), the luminance of the first portion is overall enhanced, and the luminance of the second portion is overall decreased, so that the corresponding pixels at either side of the boundary line have the same luminance level from that instant onwards.

This has the result that the boundary line disappears. These correction laws are applied to the pixels exclusively in dependence on their luminance level and independently of their position in each of the image portions. Nevertheless, it will be obvious that the laws to be applied must differ for either image portion to equalize the corresponding luminance levels at either side of the boundary line.

A further problem inherent in the image reconstruction for forming a target image from the elements of the two source images supplied by fixed real cameras which have fixed focal points and whose fields merge, resides in the fact that the user can cause the parameters of the device computing the target image, denoted virtual camera hereinafter, to vary. This virtual camera actually simulates a mobile camera, such as can be found in surveillance systems.

According to the invention, image processing means will be provided which are suitable for application to the image produced by a virtual camera which will be mobile and be controlled by the following 3 parameters:

1) varying the panoramic orientation (PAN), referred to as azimuth angle, of its optical axis, corresponding to a variation in the orientation parallel to a horizontal plane of this optical axis passing through a fixed view point common to both the fixed real camera and the mobile virtual camera; which panoramic variation is seen by the viewer as a control means enabling the mobile camera to be pointed to the fight or to the left;

2) varying the orientation (TILT), referred to as angle of sight, of its optical axis, always passing through the view point, in a vertical plane; a variation seen by the viewer as a control means which he can use to point the camera up or down;

3) varying the focal length of the virtual camera which renders it possible to furnish a more or less enlarged target image; a variation which the viewer sees as a ZOOM effect.

The device known from the cited document does not provide means for obtaining variants other than those of varying the azimuth and neither provides means for equalizing the luminances at either side of the boundary line in the reconstructed image of the mobile camera.

If one wants to provide the mobile virtual camera with the 3 control parameters mentioned in the foregoing, then the luminance correction means for each portion of the image at either side of a boundary line in the reconstructed target image, must be computed in real time, each time the user causes one or more of the parameters of the three control parameters of the virtual camera to vary.

Actually, it should be noted that a different contribution of each of the images of the real cameras to forming the reconstructed image corresponds to each variation of a parameter of the trio, and consequently the correction laws must be recomputed at each of these reconstructions, to take, for example, the relative importance of the different portions of the target image into account. The problem would not occur to the same extent if the reconstructed image were a fixed image or if it were formed in another manner than by digital processing.

To solve these problems, in accordance with the invention, the image processing system is further characterized in that the luminance equalizing system also includes a computation module (LUT.calcul):

which computes a law F establishing a correspondence between the levels of the first set (R) of luminance levels of the first portion of the target image (Ivi) and the levels of the second set (S) of the luminance levels of the second portion of the target image (Ivj), so that S=F(R) and which thereafter computes the first and second correction laws (Gi, Gj) to be applied in the first and second luminance correction modules (LUT.A, LUT.B) to equalize to the best possible extent the corresponding luminance levels in accordance with the relation (Gi(R)=Gj[F(R)].

Thus, the image processing system is provided with means for computing the first and second overall correction laws for the luminance according to the characteristics of the first and second portions of the image at either side of the boundary line of the reconstructed target image and for applying the first law to all the pixels of each luminance level of the first image portion and the second law to all the pixels of each luminance level of the second image portion.

As a result, the overall correction laws are computed and applied for any variation of the parameters of the mobile camera, and depending on the modifications of the target image which always appear at new parameters selected by the user.

In order to reduce the computation time, with the object of accomplishing these computations in real time, the image processing system of the invention is furthermore characterized in that the luminance equalizing system also comprises:

- a first memory module (MEM.A) selecting and storing a first sub-set (Ai) of pixels of the first part of the target image (Ivi) comprising a first sub-set (r) of luminance levels;
- a second memory module (MEM.B) selecting and storing a second sub-set (Aj) of pixels of the second image portion (Ivj), comprising a second sub-set (s) of luminance levels;

and in that the computation module (LUT.calcul) computes the law F of the correspondence (S=F(R) while establishing the correspondence between the luminance levels [(r) and (s)] of the two sub-sets of target image portions selected for realising the equation S=F(r) to the best possible extent.

These and other aspects of the invention will be apparent from and elucidated with reference to the embodiments described hereinafter.

BRIEF DESCRIPTION OF THE DRAWINGS

In the drawings:

FIG. 1A is a plan view showing the traces of the different image planes in the horizontal plane of the landmark in the case where the real cameras have image planes which are perpendicular to this horizontal plane;

FIG. 1B shows the landmark Px, Py, Pz viewed in projection in the horizontal plane;

FIG. 1C is an elevational view of a real image plane with its particular system of coordinate axes;

FIG. 1D is an elevational view of the target image plane with its particular system of coordinate axes;

DESCRIPTION OF THE PREFERRED EMBODIMENT

Figure 2A:
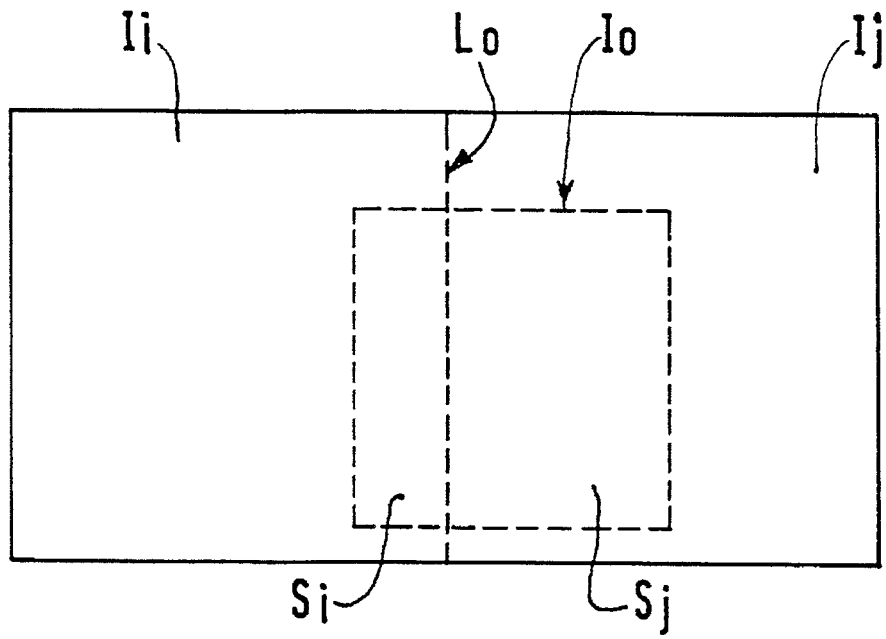
FIG. 2A represents the effect of limiting a section of the wide-angle field of view of two adjacent real cameras by means of parameters chosen by the user for the virtual camera for constructing a sub-image of a panoramic scene.
Figure 2B:
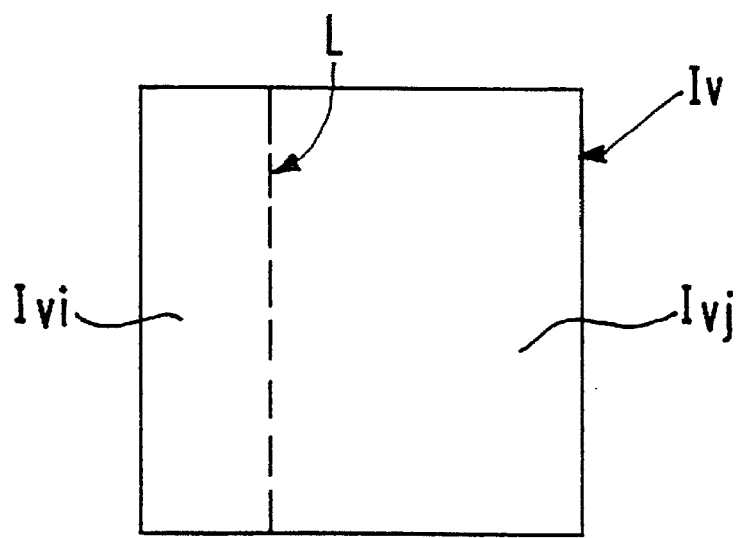
FIG. 2B shows the target image constructed by the virtual camera defined by these parameters, this target image being composed of a first image part constructed on the basis of the source image furnished by the first of the two real cameras and of a second image part constructed on the basis of the source image furnished by the second of these cameras when these two parts of the target images are strictly adjacent.
Figure 2C:
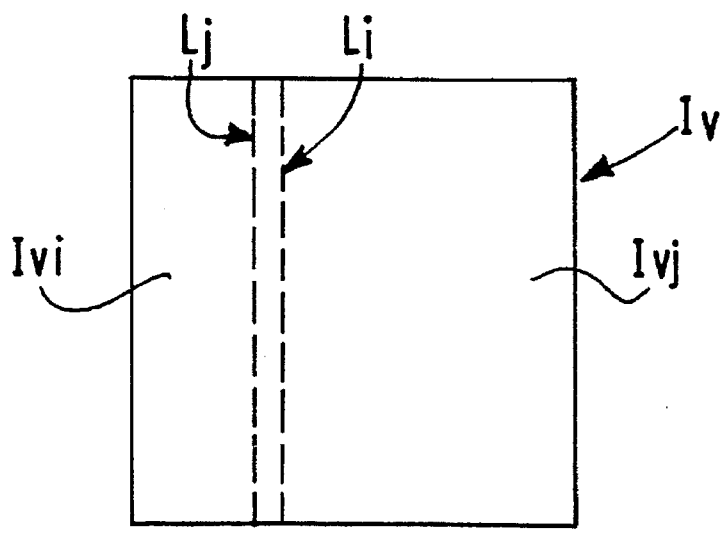
FIG. 2C represents the target image formed in the same manner as for the case of FIG. 2B, when the two source images supplied by the two adjacent real cameras have an area in which they overlap.

With reference to FIG. 1A, the image pick-up device comprises a plurality of n fixed real cameras having known and fixed focal lengths and being arranged adjacent to one another so that their individual fields of view merge to cover a wide-angle field of view. The n adjacent fixed cameras furnish n adjacent fixed images so that this image pick-up device can monitor a panoramic scene. The cameras have such optical fields that all the details of the panoramic scene are recorded by the one or the other camera so that no object under surveillance is left out.

To obtain this result, these n adjacent fixed cameras are also arranged in such a way that their optical centers P, referred to as view points, coincide. The view point of a camera is defined as the point at which each ray emitted from a luminous source and passing through this point traverses the optical system of the camera without any deviation.

The view points of the n cameras need not coincide physically. However, it will hereinafter be assumed that the condition of coincidence is fulfilled sufficiently if the distance separating each of these view points is small as regards their distance to the filmed panoramic scene, for example, if their respective distance is 5 cm or 10 cm and the distance to the panoramic scene is 5 m. The condition of coincidence is thus estimated to be fulfilled if the ratio between these distances is of the order of or is more than 50 and, according to the invention, it is not necessary to use costly optical mirror systems which are difficult to adjust for achieving a strict coincidence of the view points.

The n cameras are numbered C1, . . . , Ci, Cj, . . . , Cn supplying digital source images I1, . . . , Ii, Ij, . . . , In, respectively. For example, the source images Ii and Ij formed by two adjacent fixed real cameras Ci and Cj will be considered hereinafter.

These fixed real cameras Ci and Cj form respective images of the panoramic scene in adjacent source image planes Ii and Ij. In FIG. 1A, the axes Pzi and Pzj passing through the geometrical centers Oi and Oj of the source images Ii and Ij, respectively, represent the optical axes of the fixed real cameras Ci and Cj.

With reference to FIG. 1B, a set of orthogonal axes Px, Py, Pz, positioned with respect to ground is defined in which the axes Px and Pz are horizontal and the axis Py is vertical, and is hereinafter refferd to as "landmark".

The source images, such as the images Ii and Ij, are numbered and each pixel m of these images is marked by way of its coordinates in the image plane. As is shown in FIG. 1C, a mark of rectangular coordinates (OiXi, OiYi) and (OjXj, OjYj) is defined in each image plane in which the axes OiXi, or OjXj are horizontal, i.e. in the plane of the landmark Px, Pz. The image planes defined by (OiXi, OiYi)

and (OjXj, OjYj) are perpendicular to the optical axes Pzi and Pzj and have respective geometrical centers Oi and Oj.

Once these individual marks relating to each image plane of the cameras are established, these fixed real image planes may be related to the landmark by means of:

their azimuth angle (or pan angle) $\theta i$, $\theta j$, their angle of sight (or tilt angle) $\phi i$, $\phi j$.

The azimuth angle $\theta i$ or $\theta j$ is the angle forming a vertical plane containing the optical axis PZi or PZj with the horizontal axis Pz of the landmark. Thus, this is a horizontal angle of rotation about the vertical axis Py.

The angle of sight $\phi i$ or $\phi j$ is the angle formed by the optical axis PZi or PZj with the horizontal plane (Px, Pz). Thus, this is a vertical angle of rotation about a horizontal axis, the axis OiXi or OjXj of each image plane.

For reasons of simplicity, it has hereinafter been assumed, by way of example with reference to FIG. 1A, that the real image planes Ii, Ij furnished by the fixed cameras Ci, Cj are vertical, i.e. their angles of sight $\phi i$, $\phi j$ are zero.

For similar reasons of simplicity, the same reference in FIG. 1A denotes the trace of the planes and the axes and the corresponding planes and axes for both the source images and for the target image described hereinafter.

FIG. 1A, which is a diagrammatic plan view of the images formed, thus only shows the traces Ii and Ij of the fixed real image planes represented by segments in the horizontal plane Px, Pz.

The invention has for its object to provide a digital image reconstruction system simulating a mobile camera which is capable, by means of adjustments chosen by a user, of furnishing a digital image of any portion, or sub-image, of the panoramic scene recorded by the n fixed cameras.

FIG. 2A shows, for example, the contiguous images Ii and Ij of the panoramic scene, furnished by two adjacent fixed cameras Ci and Cj. In FIG. 2A, both images Ii and Ij are projected in the same plane for the purpose of simplicity, whereas in reality these images constitute an angle between them which is equal to that of the optical axes of the fixed cameras. In these images, the user may choose to observe any sub-image bounded by the line Io more or less to the left or to the right, more or less to the top or to the bottom with the same magnification as the fixed cameras or with a larger magnification, or possibly with a smaller magnification.

The simulated mobile camera is capable of constructing a target image Iv from parts of the source image Si, Sj bounded by the line Io in FIG. 2A. This camera is referred to as the virtual camera because it simulates a camera which does not really exist.

This virtual camera can be defined in the same manner as the fixed real cameras by means of:

its azimuth angle $\theta v$ its angle of sight $\phi v$ and its magnification (zoom effect) defined by its focal length POv, on condition that its view point P is common to the view points P of the fixed real cameras, while Ov is the geometrical center of the target image Iv. The view point of the virtual camera is common to the approximate view point as defined above for the real cameras.

FIG. 1A shows the trace denoted by Iv of the image plane of the virtual camera in the horizontal plane and its optical axis PZv passing through the geometrical center Ov of the target image Iv.

In the definition of this mobile virtual camera Co, the azimuth angle $\theta v$ is the angle made by the vertical plane containing its optical axis PZv with the horizontal axis PZ of the landmark; the angle of sight $\phi v$ is the angle made by its optical axis PZv with the horizontal plane Px, Pz of the landmark; and finally, its focal length POv is variable so that the magnification of this target image with respect to that of the source images can be changed (zoom effect).

By varying the azimuth angle $\theta v$ and the angle of sight $\phi v$, and the focal length POv, the virtual camera is entirely similar to a mobile camera which scans the wide-angle field of view formed by the merged fields of view of the different fixed real cameras C1 to Cn.

It is to be noted that the virtual camera can view a small part (or sub-section) bounded by Io of the wide-angle field of view and by realizing a magnified image Iv, for example, of the same final dimension as each of the images I1, ..., In furnished by each real camera C1, ..., Cn by varying its variable focal length POv.

It is also to be noted that the displacement of the field of view of the mobile camera may be continuous and arbitrary; this field of view corresponding to Io may be on or at both sides (Si, Sj) of the two parts (Si, Sj) of the contiguous images Ii and Ij at LO furnished by two adjacent cameras Ci and Cj.

In this case, the image Iv constructed by the virtual camera contains two different image parts, one part Ivi being constructed on the basis of information in the digital image Ii and the other part Ivj being constructed on the basis of information in the digital image Ij. In FIG. 1A, Ivi and Ivj represent the traces of the target images Ivi and Ivj in the horizontal plane.

In the foregoing, it has been mentioned that now there is a technical problem since the total luminances of the images Ii and Ij supplied by the real cameras are different. This results in the overall luminances of the image portions Ivi and Ivj also being different as can be seen in the digital image of the scenery shown by way of example in FIG. 3A.

The present invention provides a means for obviating this fault and for furnishing a reconstructed digital image having a luminance which, overall, is uniform throughout its surface.

Figure 3A:
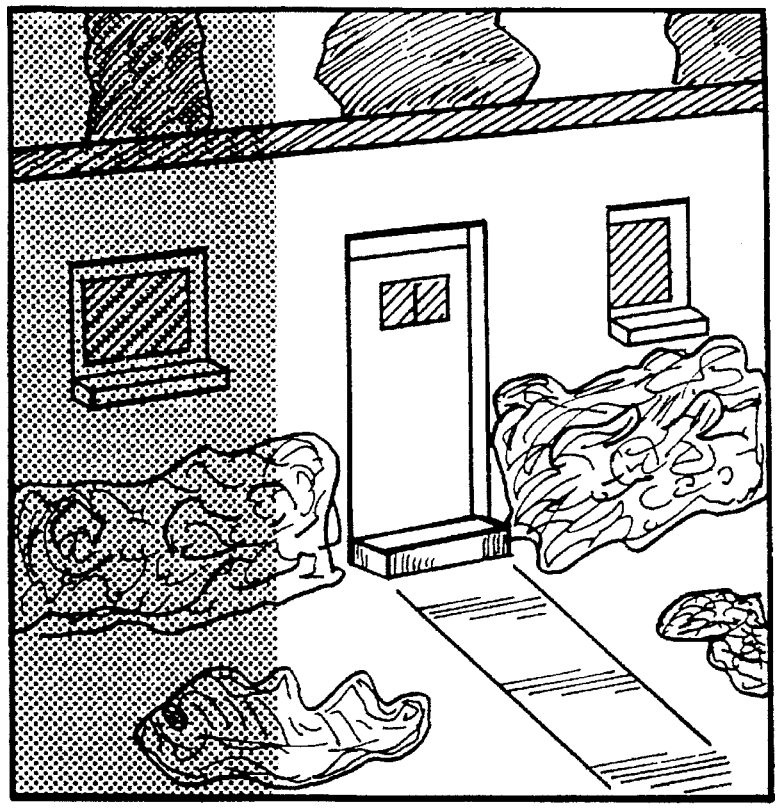
FIG. 3A represents a digital target image which has been reconstructed in the same manner as in the case of one of the FIGS. 2B or 2C, which show the total luminance difference between the first target image portion formed on the basis of the first source image and the second target image portion formed on the basis of the second source image.
Figure 3B:
FIG. 3B represents the digital target image of FIG. 3A after having been processed by the device equalizing the overall luminance.

FIG. 3B shows the digital image of the scenery of FIG. 3A in which the luminance error has been corrected by the inventive means.

As is shown in FIG. 1D, a reference set of rectangular axes (Or Xv, Ov Yv) is first defined in the plane of the digital target image Iv, in which the axis Ov Xv extends horizontally, i.e. it extends in the horizontal plane of the landmark Px, Pz. The pixel Or, being the geometrical center of the target image Iv, is furthermore located on the optical axis PZv of the virtual camera. The virtual camera will be designated Cv hereinafter. Each pixel m' of the target image plane Iv is then marked by its coordinates in the system of rectangular axes (Ov Xv, Ov Yv).

The present invention has for its first object to furnish a first law denoted Gi for the overall correction of the luminance of the pixels constituting the first target image portion Ivi formed on the basis of the elements of the first source image Ii; and to furnish a second law Gj for the overall correction of the luminance of the pixels constituting the second portion of the target image Ivj formed on the basis of the elements of the second source image Ij.

In each constructed target image, the pixels are each characterized by their location in the image, defined by their coordinates in the set of axes (OvXv, OvYv), and by their level on a luminance level scale or grey levels, with a graduation of, for example, 1 to 256; the highest luminance level being assigned to the most luminous or bright pixels; and the lowest luminance level being assigned to the least luminous pixels. The notion luminance level is equivalent to grey level. In the sequel of this description, the designation luminance level will be used.

Overall correction is herein understood to mean that the laws apply to all the pixels of a given luminance level, independent of their position in the image.

I—Stage no. 1: Selecting Target Image Portions.

To compute the first law Gi and the second law Gj, in real time, and to subsequently enable the application of these laws to the respective image portions Ivi and Ivj, also in real time, in a first stage embodied by the computation device in accordance with the invention, two groups in which there is correspondence between the pixels are selected from the digital target image Iv.

These two groups of corresponding pixels, denoted Ai and Aj, respectively, can be selected as groups of corresponding pixels in the digital images Ivi and Ivj, respectively, in accordance with two different methods, which are equivalent for achieving the object of the invention.

In both methods the first portion of the target image Ivi is selected for furnishing the first sub-set Ai, and the second portion of the target image Ivj is selected for furnishing the second sub-set Aj.

a) First Method

The first method, called the BORDER method to distinguish it from the second method, takes account of the hypothesis in accordance with which the digital target image Iv is formed by simply juxtaposing the portions of the digital target images Ivi and Ivj in an edge-to-edge relationship, without overlap. The target image Iv then shows a single straight boundary line L between the image portions Ivi and Ivj. This straight boundary line is located between two lines or between two columns of pixels of the digital target image Iv.

Figure 4A:
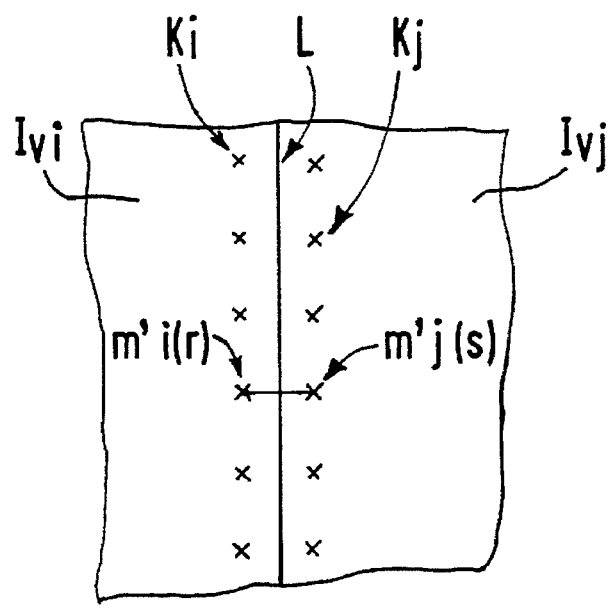
FIG. 4A illustrates the selection of the target image portion in accordance with the border method.

FIG. 4A illustrates the implementation of the BORDER method when the straight boundary line L is vertical, consequently located between two columns of pixels of the target image Iv.

In the BORDER method, the pixels located in the pixel columns Ki which form a band adjacent to the straight boundary line L in the image portion Ivi are selected as the first group Ai; and the pixels which are symmetrical to the straight boundary line L located in the first pixel column Kj forming a band adjacent to the straight boundary line L in the second image portion Ivj are selected as the second pixel group Aj.

If the straight boundary extends horizontally, then the pixels of the two groups Ai and Aj in the lines located at either side of this boundary are selected.

If it is found that the straight boundary is an arbitrary boundary, pixels which are symmetrical to the straight boundary are selected as corresponding pixels.

By way of example, which a person skilled in the art can easily generalize in case the straight boundary is positioned differently, the following account describes the invention for the case in which the boundary is vertical.

Then the corresponding pixels of the corresponding groups Ai and Aj are pairs which are located in the same horizontal line of the digital target image Iv, in two adjacent, vertical columns Ki, Kj at either side of the straight boundary L. Each pair of corresponding pixels, for example m'i, m'j then has in the special orthogonal reference area on the target image Iv:

the same ordinate on the axis Yv, an abscissa differing by 1 pixel on the axis Xv, and a different luminance level, a level the device according to the invention will try to equalize.

b) Second Method

The second method, called the OVERLAP method, takes account of the hypothesis in accordance with which the digital target image is formed such that there is overlap of a small band of a few pixels wide (not more than 10 pixels) of the second target image portion Ivj in the first target image portion Ivi or vice versa. The second target image portion has for its limit Lj, and the first image portion has for its limit Li, so that the overlapping band has a width LiLj, and extends parallel to the limits Li, Lj.

Figure 4B:
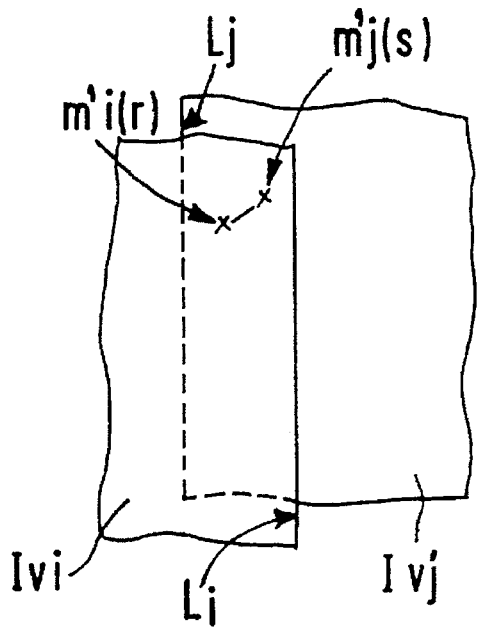
FIG. 4B illustrates the selection of the target image with overlapping areas.

FIG. 4B illustrates the implementation of the "OVERLAP" method when the boundary, so in this case the band LiLj, extends vertically. For a person skilled in the art, it will be easy to alter this method for application in the case in which the boundary extends horizontally.

For the case in which the boundary is vertical, the group in which there is correspondence formed by pixels located in the portion of the overlapping band belonging to the first target image portion Ivi is now called Ai. The group in which there is correspondence formed by pixels located in the portion of the overlapping band belonging to the second image portion Ivj is now called Aj.

In this case, the corresponding pixels of the groups Ai, Aj are the pixel pairs m'i, m'j, for example, which have the same abscissas as well as the same ordinates in the orthogonal reference area OvXv, OvYv of the target image Iv; but which, as in the BORDER method, do not have the same luminance level.

For the case of the invention, in which the images are digital, the existence of overlap between the two target image portions Ivi and Ivj does not imply that the band LiLj has an overall luminance different from the luminance of both the image portion Ivi and the image portion Ivj. If there is no luminance equalizing means in the virtual camera, the latter has at least the possibility of forming the target image portion Iv by juxtaposing the portions Ivi, Ivj. In the OVERLAP method no efforts are therefore made to equalize the luminance of three regions: the first target image portion, the overlapping band, the second target image portion; but only the luminance of two portions: the first target image portion Ivi and the second image portion Ivj, as in the BORDER method.

II—Stage no. 2: Computing the Law of Correspondence F

In a second stage implemented in the system according to the invention, a law F is computed which causes the set of luminance levels S of the second target image portion Ivj to correspond to the set of corresponding luminance levels R of the first target image portion Ivi, so that:

$$S = F(R)$$

This equation written on the two sets S and R signifies that one wants to compute a law F which to the best possible extent links each luminance level of R with each corresponding luminance level in S.

Corresponding luminance levels are understood to mean levels which would be equal if the first and second image portions Ivi and Ivj were formed by means of one single camera.

In both methods, this law F is computed taking account of the pixels contained in the groups with correspondence Ai, Aj; so taking a small number of pixels into account: for the BORDER method, the number of pixels involved in the computation is limited to twice some columns of pixels; and in the OVERLAP method the number of pixels involved in the computation is likewise limited to twice a few columns of pixels. A few columns must be understood to be, for example, 1 to 10 columns. When it is borne in mind that a normal digital image may contain slightly more than 500 columns (or 1000 columns) of more than 500 (or 1000) pixels each, the BORDER and OVERLAP methods make it possible to save an enormous amount of computing time.

Hereafter, the following designations are used:

r for the set of different luminance levels present in the second group with correspondence Ai.

s for the set of different luminance levels present in the second group with correspondence Aj.

Each luminance level of the set r has a corresponding luminance level in the set s, while each group Ai, Aj has the same number of pixels;

One tries to compute the law F which links to the best possible extent the luminance level r of the pixels of the sub-set Ai to the luminance level s of the corresponding pixels of the sub-set Aj.

Thus, each luminance level in the set r is linked with a luminance level in the set s, by the law of correspondence F, so that the equation s=F(r) will be realized to the best possible extent.

Once the law F has been computed by means of the selected groups with correspondence Ai, Aj, this law F can be applied to put in correspondence the set R of the luminance levels of Ivi, and the set S of the luminance levels of Ivj, so that S=F(R) to the best possible extent.

Figure 5:
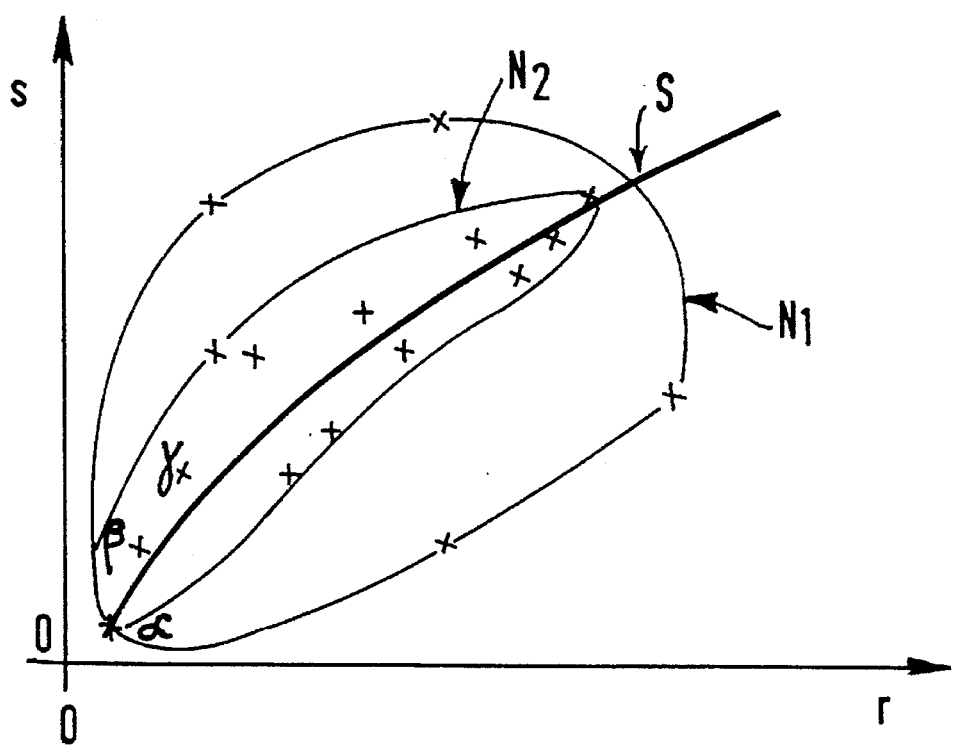
FIG. 5 is a graph illustrating the points of correspondence of the luminance levels (r, s) for computing the law F.

This can be plotted in a graph, as shown in FIG. 5:

on the horizontal axis $\vec{r}$ the luminance levels of all the first pixels m'i of the pairs of corresponding pixels contained in the first group with correspondence Ai;

on the vertical axis $\vec{s}$ the luminance levels of all the second pixels m'j of the pairs of corresponding pixels contained in the second group with correspondence Aj.

By causing the luminance levels of each pair to correspond graphically in this graph, coordinate points (r, s) are found which must theoretically be present in a law of correspondence F of the luminance levels of Ai and Aj.

In this graph, which takes the pairs (m'i, m'j) of corresponding pixels of the groups Ai, Aj into consideration, certain pairs are not representative of the law of correspondence one tries to compute:

either because the BORDER method has been chosen, which considers a very limited number of pixels and because in these pairs some of them do not relate to a luminance correspondence, but relate to a real discontinuity in the luminance of the original panoramic scene;

or because the target image computation system, which is not described as it does not form part of the invention, but is nevertheless indispensable for furnishing the pixels of the target image Iv (i.e. their coordinates and their luminance level), has not provided a perfect geometrical reconstruction in accordance with the original source images (due to spherical aberrations contained in the source images which are poorly corrected during the reconstruction of the target image, for example); thus, in certain pairs, the two corresponding pixels do not in fact originate from the same zone of the panoramic scene, and therefore need not have the same luminance in the ultimate target image.

Consequently, in the graph, given pixel pairs (m'i, m'j) do not yield, when one searches for the point of correspondence of the coordinates (r, s) of their luminance levels, a point located in the law F. Such a point is said to be deviating.

Thus, because of the aforementioned faults, it appeared that, instead of being all disposed precisely along the curve representing the law F, the points of correspondence of the coordinates (r, s) actually form a cluster of points at a smaller or larger distance from this curve.

According to the invention, the law F is defined as the law minimizing the energy of the difference between the luminance levels of the set s.

A person skilled in the art knows a plurality of mathematical methods capable of solving this problem and how to effect the correspondence between the luminance levels r and s.

However, the present invention has for its object to provide the means:

for solving this problem in the presence of deviating pixel pairs, to solve this problem in real time, these means must be embodied in a device.

By way of example, let it be assumed that in the first group of correspondence Ai, the set r is present, which comprises the luminance levels:

r (1, 2, 3, 4 . . . )

and in the second group of correspondence Aj, the set s is present, which comprises the luminance levels:

s (1, 3, 5, . . . )

This means that:

the luminance level 1 of the set r corresponds to the luminance level 1 of the set s, which yields the point of correspondence α (1, 1) in the graph, the luminance level 2 of r corresponds to the luminance 3 of s, which yields the point of correspondence β (2, 3) in the graph, the luminance level 3 of r corresponds to the luminance level 5 of s, which yields the point of correspondence γ (3, 5), etc . . . .

The law F is the law which passes to the best possible extent through the points of correspondence α, β, γ, . . . . In actual practice, drawing up this graph does not furnish a correspondence curve F which simply joins the points of correspondence because these points of correspondence form a cluster N of points. In this case, that law F must be found that passes to the best possible extent through a maximum number of points of correspondence.

A method of computing the function F will now be described, which links the luminance levels of the set r of Ai with the set s of Aj.

One of the difficulties met in the determination of this law is that the set of Ai, and consequently the corresponding set s of Aj do not necessarily comprise all the samples of the luminance levels existing in the target image portions Ii and Ij. However, in a general way, experiments showed that in Ai and Aj, as defined in the foregoing, a sufficient sampling of the luminance levels is found, on the condition that for F a law is selected which must be:

uniform monotonic and which can be either concave of convex.

Actually, because of the fact that the number of luminance levels in (r, s) is smaller than in (R,S), certain laws can furnish a correct correspondence of the luminance levels in (r, s) of Ai, Aj, and have a catastrophic effect when applied in (R,S) for the construction of Iv from Ivi, Ivj.

From experiments it has been found that laws of the shape:

$$F(r) = ar+b$$

or $$F(r) = ar^2+br+c$$

cannot solve the problem of putting the luminance levels of Ai in correspondence with the luminance levels of Aj in all of the contemplated possible cases.

Thus, in accordance with the invention, it is proposed to implement the law:

$F(r)=a+br^c$, denoted "gamma law", as well as means for determining the coefficients a, b, c which render it possible to use this law in the computation of F, in real time, and in such a manner that this means can be embodied in a device. This law has yielded the best results when applied to a large number of situations, compared to other laws which were tried.

In order to take precautions against errors in the determination of the coefficients a, b, c, due to the presence in Ai, Aj of deviating pixel pairs, as described hereinbefore, the invention provides recursive computation means which render it possible to start from a coarse determination of these coefficients to arrive at a fine determination by determining, at each iteration step, in the graph, a distance to points located on the curve which is representative of the law F computed in this iteration step, while eliminating the points (r, s) of the graph which are at a greater distance than the chosen distance, and by thereafter choosing during the following iteration step a smaller distance by means of which it is possible to eliminate the points (r, s) located at a greater distance than those new, chosen distance etc.

In a more general method, each coordinate point (r, s) can be assigned a weight which is the greater according as this point is nearer (at a small geometrical distance) to the curve which is representative of the law F determined during the preceding iteration step. And at each iteration step the points are modified to give greater preference to the points according as they are nearer to the curve. And the curve F is then recomputed.

However, the shape of the "gamma" law which has a coefficient "c" as exponent, might cause the computations to be slow. In fact, to determine the best "gamma" law, the iteration method assumes that several values of each coefficient c are tried for each iteration step, whereafter the coefficients a and b are computed.

To obviate this drawback and to enable fast computations, in accordance with the invention, the method of determining the law F is effected by a double iteration, in which each step has two phases.

In a first phase, in which the parameters a,b,c are determined, a first stage is first performed in which a first value of the parameter c of the exponent is established and in which the parameters a and b are computed for a first cluster N1 in which all the coordinate points (r, s) are taken into account, thereafter the following stages in which the second and thereafter the third values of the parameter c of the exponent are established and the parameters a and b computed for the first cluster of points (r, s). At the end of these stages, the values of a group of parameters a,b,c are selected as furnishing the best function $F(r)=a+br^c$ passing to the best possible extent through the first cluster of points (r, s).

Thereafter a second thinning phase is undertaken. In this phase the points of the first cluster N1 that are most remote from the function F(r) determined in the first phase are eliminated to keep a second cluster N2 of thinned-out points.

In the following step of the double iteration method, the first phase is carried out by fixing the experimental values of the parameter c around the value determined in the preceding step, by selecting the parameters a, b, c to provide that the function $F(r)a+br^c$ passes to the best possible extent through the second cluster of thinned-out points.

This double iteration is continued until the function $F(r)=a+br^c$ passes to the best possible extent through the remaining points (r, s) whose distance to the curve which is representative of this function F(r) is less than a distance which is still permissible.

The law F found by the computation of s=F(r) is thereafter applied to the corresponding luminance levels in the sets R and S relating to the target image portions Ivi, Ivj according to the relation:

$$S=F(R)$$

III—Stage no. 3: Computing the Laws for Correcting the Luminance Gi, Gj.

In a third stage, in accordance with the invention, means are thereafter provided for computing two laws, Gi, Gj which can act on the levels of the set R and the levels of the set (S), respectively, for adapting these levels individually in order to obtain the equalization of the corresponding levels.

This has for its result that the overall equalization of the luminances in the first and second target image portions Ivi, Ivj is achieved when the equation written on the corresponding luminance levels of the sets R and S is realized to the best possible extent:

$$Gi(R)=Gj(S)$$

As in the second stage implemented by the device according to the invention, the luminance level sets R and S have been brought in correspondence by the computation of the law F, which is applied in such a manner that S=F(R), the result is that the laws Gi and Gj acquire the overall equalization of the corresponding luminance levels in accordance with the relation:

Gi(R)=Gj[F(R)], this equalization being realized to the best possible extent, and that, in this case, the straight boundary disappears from the reconstructed target image.

Referring again to the example described to illustrate stage no. 2, if in the set R the luminance levels 1, 2, 3 ... are found and in the set S the corresponding luminance levels 1, 3, 5 ... etc., the law Gi which will be found will act on the different luminance levels 1, 2, 3 of R to bring these levels to a value between their actual value and the value of the corresponding level in S. Similarly, the law Gj which will be found, will act on the luminance levels 1, 3, 5, ... of S to bring these levels to a value between their actual value and the value of the corresponding level in R. So that:

$$Gi(1)=Gj(1)$$

$$Gi(2)=Gj(3)$$

$$Gi(3)=Gj(5) \text{ etc } ...$$

and in a general manner:

$Gi(R)=Gj(S)$ to the best possible extent.

A person skilled in the art will not hesitate in the majority of cases to choose Gi or Gj to be fully identical, and to provide that one of the sets of grey levels remains the same in the luminance equalizing laws, and that the other set of grey levels is lowered or raised to obtain the equation; for example, by simply applying the law F or $F^{-1}$ to the luminance levels of one of the sets.

If a person skilled in the art proceeds in this manner, the target image obtained will indeed most certainly show an overall equalized luminance, but this final target image will include a correct image portion, and the other image portion will really be of a poorer quality. It must actually be taken into account that each one of the real cameras has control units which are specifically provided for furnishing optimum images; if the two target image portions show luminance differences, this is caused by the fact that each one of the real cameras has optimized the source image from which one of the target image portions originates, and that this optimization differs from one camera to the other.

It is therefore not possible to act on the luminance levels of the target image portions without degrading them a little.

According to the invention, a solution is proposed to obtain the overall equalization of the luminances with a minimum of image portion degradation.

To this end, the following two equalizing laws are proposed:

$$Gi(R)=kF(R)+(1-k)R$$

$$Gj(R)=kR+(1-k)F^{-1}(R)$$

wherein K=a constant $$0 \leq k \leq 1$$

the so-called mixing factor, and R are the different luminance levels existing in the first portion of the target image portion Ivi.

This constant k acts in the following manner:

If k=1, the luminance levels of the set R are rendered equal to the luminance levels of the set S. If k=0, the opposite occurs.

Preferably, k is chosen equal to the surface area percentage of the second target image portion Ivj in the overall target image Iv.

Thus it is found that if in the overall image Iv the image surface Ivj is small, k is then near 0, and the luminance levels of the first image portion Ivi, which has the larger surface will be little changed, whereas the luminance levels of the second image portion Ivj, which has proportionally the smaller surface will be changed most to effect the overall luminance equalization.

Therefore, when in the apparatus designated the virtual camera, the user changes the parameters θ, φ or the focal length, the constant k varies, a new law F is computed and thereafter the new laws Gi, Gj are applied to the sets R and S.

A device performing the computation of the functions Gi, Gj described hereinbefore will be described hereafter.

IV—Device for Performing the Stages of the Luminance Equalizing Method

Figure 6:
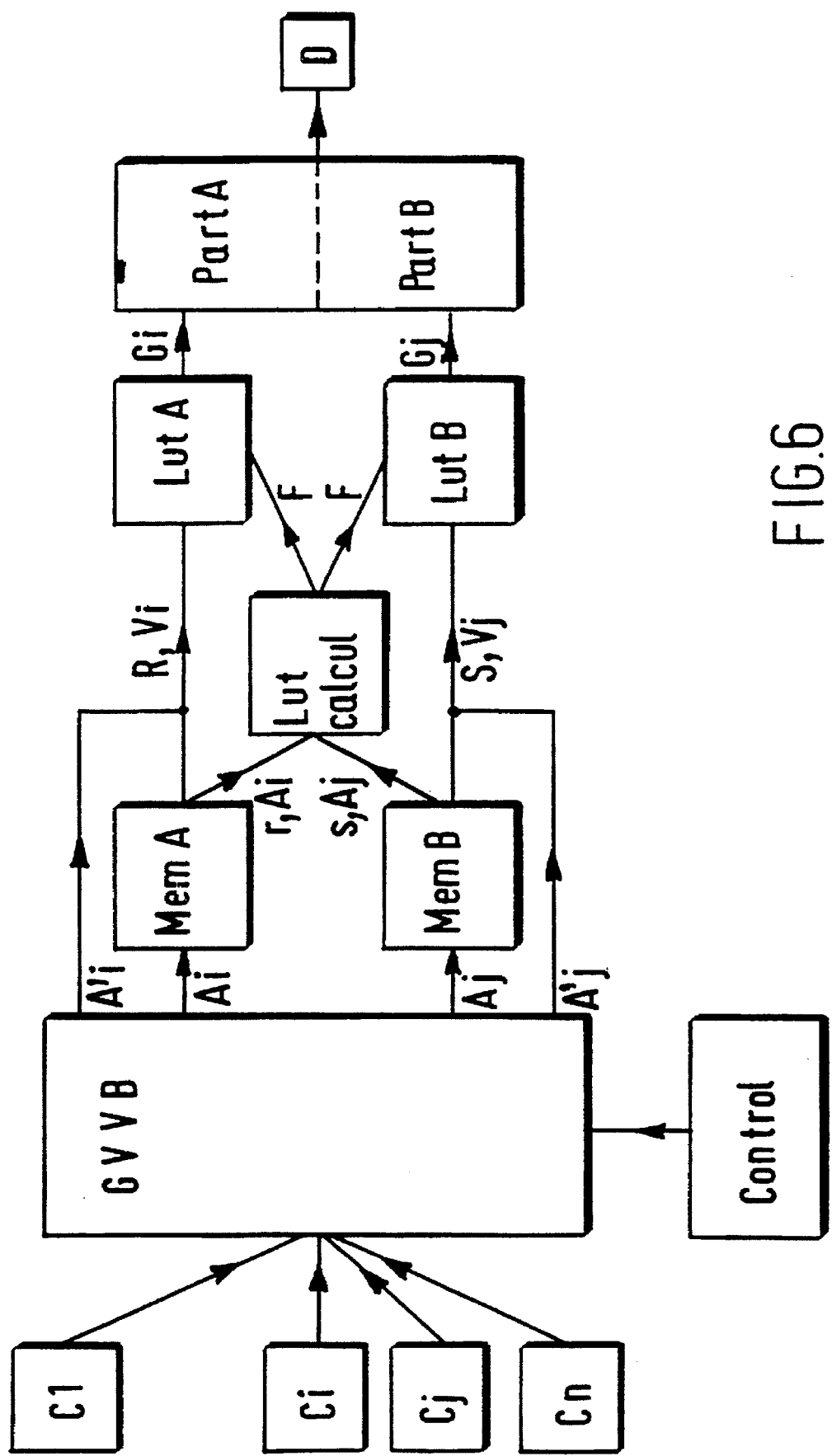
FIG. 6 shows the circuit diagram of the image processing system in the form of functional blocks.

Referring to FIG. 6, which illustrates the signal processing device in the form of functional blocks, this device comprises:

a) the n fixed pick-up cameras C1, ... Ci, Cj ... Cn, disposed in such a manner that their individual fields of view merge so as to form a single wide-angle field of view for recording a panoramic scene. They have their view points P substantially common with the aforedescribed precision, and their focal lengths are fixed and known.

b) a control system (CONTROL) with the aid of which the user can influence the angles of sight and of azimuth and a focal length in such a manner that the control system associated with an image construction system simulates a virtual mobile camera Cv.

c) a target image construction system, GVVB= (Geometrical Virtual View Builder). This system forms a target image Iv from characteristic features of the source images I1 ... Ii, Ij .... In supplied by the real cameras, i.e. the coordinates of the pixels and the luminance, corresponding to the parameters displayed by the user on the control system.

The image construction system furnishes four groups of data:

I) The data relating to the pixels of the remaining portion A'i of the first image portion Ivi, i.e. the pixels which are not comprised in the selected portion Ai. The pixels of A'i are also characterized by their position in the target image Iv and by their luminance level in the set R of Ivi.

II) The data relating to the pixels in the selected portion Ai of the first image portion Ivi, i.e. the coordinates and the luminance levels r of each pixel of Ai.

III) The data relating to the pixels of the selected portion Aj of the second image portion Ivj: i.e. the coordinates and the luminance levels s of each pixel of Aj.

IV) The data relating to the pixels of the remaining portion A'j of the second image portion Ivj: i.e. the pixels which are not comprised in the selected portion Aj. The pixels of A'j are also characterized by their position in the target image Iv, and by their luminance level in the set S of Ivj.

d) Two memories MEM.A and MEM.B. The first memory MEM.A receives the data relating to the pixels of the selected portion Ai and the second memory MEM.B receives the data relating to the pixels of the second selected portion Aj.

e) The computation module (LUT): this module first computes the law F in accordance with the relation s=F(r) using the double recurrence described in stage No. 2 of the method according to the invention, on the basis of data relating to the pixels of the selected portions Ai, Aj available in MEM.A and MEM.B.

This module thereafter computes the correction laws Gi and Gj. This module applies the previously computed laws F to the data relating to the complementary portions A'i available at the output I) of the GVVB. Consequently, this module computes for each luminance level of the set R of Ivi, the law $Gi(R)=kF(R)+(1-k)R$. This module also applies the law F to the data relating to the selected portion Aj available in MEM.B and to the data relating to the complementary portion A'j available at the output IV of the GVVB. Consequently, this module computes for each luminance level F(R)=S of Ivj the law $Gj(R)=kR+(1-k)F^{-1}(R)$. It is also possible to choose k to be equal with respect to the surface of the second image portion Ivj, over the entire surface of the target image Iv.

f) Two modules, LUT.A and LUT.B, respectively, which apply the laws Gi and Gj to each pixel of the first and second target image portions Ivi, Ivj in accordance with the luminance levels in the sets R and S, in such a manner that they fully equalize the corresponding levels.

g) Two modules PART.A and PART.B storing the data provided by LUT.A and LUT.B, respectively, for constituting the first and second image portions Ivi and Ivj.

h) A display or recording module D.

The computation module LUT is not wired; it is a microprocessor which performs the above-described computations. The other modules may be software modules, for example look-up tables.

The luminance equalizing device described here is not limited to correcting luminances in the images formed by adjacent cameras. It could also be applied to superposing temporary images in the case of a sequence of images.

In a variation of the implementation of the invention, it may happen that the cameras C1 . . . Cn employ image acquisition tables which each contain already a look-up table.

This means that there is already a module LUT such as LUT. 1 . . . , LUT.n in each camera module C1 . . . Cn. In that case the modules LUT. A and LUT.B can be omitted from the diagram of FIG.6. The result of the computations by the computation module must then be transferred for modifying the data contained in the corresponding tables LUT.i, LUT.j in the cameras Ci, Cj.

Thereafter the outputs of the different tables of the cameras LUT. 1 . . . LUT.i, LUT.j . . . LUT.n are entered into an image construction system GVVB.

This nevertheless renders it necessary to have two image construction systems of the GVVB-type available: a first system which applies the data to MEM.A and MEM.B for the computation module LUT and a second system which now constructs the corrected final image.

On the other hand, it should be noted that the real cameras may provide analog data. In that case, analog-to-digital converter modules are used to form the digital source images.

However, for constructing the target image, in accordance with the invention, not more than two or three source images are required, so only two or three converters, respectively.

If the number of real cameras C1 . . . Cn exceeds the number of source images used, a multiplexing module may be disposed between the analog outputs of the cameras and the inputs of the converters for selecting the active real cameras according to the characteristics of the virtual mobile camera, for example in accordance with the azimuth angle.

Thus, if there are six real cameras, and if the number of necessary source images does not exceed two, only the analog-to-digital converters will be used, and a multiplexer for choosing from the six cameras the active real cameras Ci, Cj to supply the two digital source images at the outputs of the corresponding converters.

The output of the converters is thereafter applied to the input of the image construction system GVVB.

We claim:

1. An image processing system comprising:
    a system of n fixed real cameras arranged in such a way that their individual fields of view merge so as to form a single wide-angle field of view for recording a panoramic scene,
    an image construction system simulating a mobile, virtual camera (Cv) continuously scanning the panoramic scene to furnish a target sub-image (Iv) corresponding to an arbitrary section of the wide-angle field of view and constructed from adjacent source images (I1, . . . , Ii, Ij, . . . , In) furnished by the n real cameras,
    wherein said processing system is a digital system that further comprises:
    a luminance equalizing system for overall equalizing of corresponding luminance levels of first and second portions of a digital target image derived from two adjacent source images (Ii, Ij), said luminance equalizing System including first and second luminance correction modules which apply a first and a second correction law (Gi, Gj), respectively, to first and second sets (R,S) of the corresponding luminance levels of the first and the second portion (Ivi, Ivj) of the digital target image derived from said two adjacent digital source images (Ii, Ij), to equalize the corresponding luminance levels to the best possible extent, in accordance with a relation Gi(R)=Gj (S).

2. An image processing system as claimed in claim 1, wherein the luminance equalizing system also includes a computation module:
    which computes a law F establishing a correspondence between the first set (R) of luminance levels of the first target image portion (Ivi) and the second set (S) of luminance levels of the second target image portion (Ivj), so that S=F(R), and which thereafter computes the first and second correction laws (Gi,Gj) to be applied in the first and second luminance correction modules to equalize to the best possible extent the corresponding luminance levels in accordance with a relation Gi(R)=Gj[F(R)].

3. A system as claimed in claim 1, characterized in which further comprises, for constructing the target image (Iv) in the image construction system (GVVB):
    a control module controlling the mobile virtual camera (Cv) using 3 parameters:
    1) varying the panoramic orientation (PAN), designated the azimuth angle, of its optical axis, corresponding to a variation in the orientation parallel to a horizontal plane of the optical axis passing through a fixed view point common to all of the fixed real cameras and the mobile virtual camera;
    2) varying the orientation (TILT), designated the angle of sight, of its optical axis, always passing through the fixed view point, in a vertical plane; and
    3) varying the focal length of the virtual camera to furnish a more or less enlarged target image.

4. A system as claimed in claim 1, which further comprises modules for storing processed data of the first and second target image portions (Ivi, Ivj), and a display or recording module.

5. A system as claimed in claim 1, which further comprises:
    a multiplexing module for selecting from all of the real cameras C the two cameras (Ci, Cj) which correspond to the source images (Ii, Ij) required for providing the data of the target image portions (Ivi, Ivj) used in the construction of the target image (Iv); and
    two analog-to-digital converter modules for converting respective analog data supplied by the two selected real cameras (Ci, Cj) into digital data to form the two corresponding digital source images (Ii,Ij).

6. An image processing system as claimed in claim 2, wherein the computation module determines the law F for the correspondence S=F(R) as the correspondence which causes the set (r) of the luminance levels of the first pixels of each pair, in the first subset (Ai), to correspond to the best possible extent to the set(s) of the corresponding luminance levels of the second pixels of each pair in the second subset (Aj) to realise to the best possible extent the equation: s=F(r), and wherein the correspondence function F is given by $F(r)=a+br^c$, where a, b and c are constants determined by iteration.

7. An image processing system as claimed in claim 2, wherein the computation module computes the first luminance correction law (Gi) and the second law (Gj) as linear functions of the law of correspondence F(R).

8. An image processing system as claimed in claim 7, the first correction law is chosen to be Gi(R)=kF(R)+(1−k)R, and the second correction law is chosen to be Gj(R)=k.R+ (1−k)F$^{-1}$(R), wherein k is a constant which takes into account the surface proportion of one of the target image portions (Ivi, Ivj) in the overall image.

9. An image processing system as claimed in claim 2, wherein the luminance equalizing system also comprises:

a first memory module for selecting and storing a first sub-set (Ai) of pixels of the first target image portion (Ivi), comprising a first sub-set (r) of luminance levels;

a second memory module for selecting and storing a second sub-set (Aj) of pixels of the second target image portion (Ivj), comprising a second sub-set (s) of luminance levels;

and wherein the computation module computes the law F of correspondence S=F(R) by establishing the correspondence between the luminance levels of the two sub-sets (Ai, Aj) of target image portions selected for realising the equation s=F(r) to the best possible extent.

10. An image processing system as claimed in claim 9, characterized in that in the first and second memory modules, the first and second target image portions (Ivi, Ivj) furnish the first and second sub-sets (Ai, Aj):

by determining a position of a straight boundary line which, in the target image (Iv) corresponds to a border-to-border coincidence of the two target image portions (Ivi, Ivj) derived from the two adjacent source images (Ii and Ij), by selecting, as the first and second subsets (Ai, Aj) of pixels, the pixels aligned in the rows and columns which are parallel to the straight boundary line and symmetrical with respect to said straight boundary line, at either side of the straight boundary line, in the first and second target image portions (Ivi, Ivj), respectively, and in that in the computation module for the law of correspondence F:

the pixels of the first and second subsets (Ai, Aj), respectively, are transferred and classified by pixel pairs which are considered to correspond if they have as their coordinates the same coordinate on an axis parallel to the straight boundary line, and a coordinate which is symmetrical relative to the coordinate of the straight boundary line on an axis perpendicular to the straight boundary line, in a system of axes in the target image (Iv).

11. An image processing system as claimed in claim 9, characterized in that in the first and second memory modules, the first and second target image portions (Ivi, Ivj) are selected:

by determining an overlapping band (LiLj) which, in the target image (Iv), corresponds to an overlap of the two target image portions (Ivi, Ivj) one over the other, the limit of one band (Li) defining the parallel limit (Lj) of the other for forming the overlapping band derived from a zone in which the fields of view of the two adjacent real cameras (Ci, Cj) which furnish the source images (Ii, Ij) from which the target image portions (Ivi, Ivj) are constructed, overlap, by selecting as the first and second subsets (Ai, Aj) of pixels, the pixels of the overlapping band located in the first and second target image portions (Ivi, Ivj), respectively, and in that in the computation module for the law of correspondence F:

the pixels of the first and second subsets (Ai, Aj), respectively, are transferred and classified by pixel pairs which are considered to correspond if they have the same coordinates in a system of axes in the target image (Iv).

12. An image processing system as claimed in claim 10, wherein the computation module determines the law F for the correspondence S=F(R) as the correspondence which causes the set (r) of the luminance levels of the first pixels of each pair, in the first subset (Ai), to correspond to the best possible extent to the set (s) of the corresponding luminance levels of the second pixels of each pair in the second subset (Aj) to realise to the best possible extent the equation:

$$s=F(r).$$

13. An image processing system as claimed in claim 12, wherein the computation module computes the law F by means of an iterative thinning-out method by computing in a first step the function s=F(r) which approximately passes through a cluster of points N1 constituted by the luminance levels (r, s) of corresponding pairs of pixels, thereafter in a subsequent step, by weighting the points (r, s) according to their distance from a curve which is representative of the function s=F(r), the smallest weights being associated with the points most remote from said representative curve, for forming a second cluster of points N2 and by recomputing the function s=F(r) with the weighted points of said second cluster (N2), and by reducing at each step the weights of the points most remote from the curve which is representative of the function s=F(r) until the curve which is representative of the function s=F(r) passes to the best possible extent through the remaining points to which the largest weights were assigned.

14. An image processing system as claimed in claim 12, wherein the computation module computes the law F by means of an iterative thinning-out method by first computing the function s=F(r) which approximately passes through a cluster of points N1 constituted by the luminance levels (r, s) of a pair of corresponding pixels, thereafter in a subsequent step, by eliminating the points (r, s) located at a distance larger than a predetermined permissible distance from a curve which is representative of the approximative function s=F(r), to preserve a second cluster of points N1 and by recomputing the function s=F(r) using the remaining points (r, s) in the thinned-out second cluster N2, thereafter, then in each subsequent step, by reducing the value of the predetermined permissible distance between the points (r, s) and the curve which is representative of the function s=F(r), by eliminating the points (r, s) located at a distance larger than the permissible distance, and by recomputing the function s=F(r) using the remaining points (r, s), until the curve which is representative of the function s=F(r) passes to the best possible extent through the remaining points (r, s).

15. An image processing system as claimed in claim 12, wherein the correspondence function F is given by the following:

$$F(r)=a+br^c$$

wherein a, b and c are constants determined by iteration, such that the computation module determines the law F by double iteration, in which each step comprises two phases in which a first phase for determining the parameters a, b, c includes a first stage in which a first value of the parameter c of the exponent is fixed and the parameters a and b are computed for a first cluster N1 of points (r, s) of subsequent stages in which the second, third . . . , etc. values of the parameter c of the exponent are fixed and the parameters a and b are computed for the same cluster N1 of points (r, s), whereafter the values of a group of parameters a, b, c are selected as furnishing the best function $F(r)=a+br^c$ passing to the best possible extent through the first cluster N1 of points (r, s), while subsequently a second thinning-out stage is carried out in which the points of the first cluster N1 most remote from the function F(r) determined in the first phase are eliminated to preserve a second cluster N2 of thinned-out points, in the subsequent step the first phase is carried out by fixing the trial values of the parameter c as the value determined in the preceding step and the values around this value, by selecting the parameters a, b, c to ensure that the function $F(r)=a+br^c$ passes to the best possible extent through the second cluster N2 of thinned-out points (r, s), and by continuing this double iteration until the function $F(r)=a+br^c$ passes to the best possible extent through the remaining points (r, s) whose distance to the curve which is representative of the function F(r) is less than a distance determined as being permissible.

16. An image processing system as claimed in claim 11, wherein the computation module determines the law F for the correspondence S=F(R) as the correspondence which causes the set (r) of the luminance levels of the first pixels of each pair, in the first subset (Ai), to correspond to the best possible extent to the set(s) of the corresponding luminance levels of the second pixels of each pair in the second subset (Aj) to realise to the best possible extent the equation:

$$s=F(r)$$

17. An image processing system as claimed in claim 16, wherein the correspondence function F is given by the following:

$$F(r)=a+br^c$$

wherein a, b and c are constants determined by iteration, such that the computation module determines the law F by double iteration, in which each step comprises two phases in which a first phase for determining the parameters a, b, c includes a first stage in which a first value of the parameter c of the exponent is fixed and the parameters a and b are computed for a first cluster N1 of points (r, s) of subsequent stages in which the second, third . . . , etc. values of the parameter c of the exponent are fixed and the parameters a and b are computed for the same cluster N1 of points (r, s), whereafter the values of a group of parameters a, b, c are selected as furnishing the best function $F(r)=a+br^c$ passing to the best possible extend through the first cluster N1 of points (r, s), while subsequently a second thinning-out stage is carried out in which the points of the first cluster N1 most remote from the function F(r) determined in the first phase are eliminated to preserve a second cluster N2 of thinned-out points, in the subsequent step the first phase is carried out by fixing the trial values of the parameter c as the value determined in the preceding step and the values around this value, by selecting the parameters a, b, c to ensure that the function $F(r)=a+br^c$ passes to the best possible extent through the second cluster N2 of thinned-out points (r, s), and by continuing this double iteration until the function $F(r)=a+br^c$ passes to the best possible extent through the remaining points (r s) whose distance to the curve which is representative of the function F(r) is less than a distance determined as being permissible.

18. An image processing system comprising:

a system of n fixed real cameras arranged so that their individual fields of view merge so as to form a single wide-angle field of view for recording a panoramic scene, an image construction system simulating a mobile, virtual camera (Cv) continuously scanning the panoramic scene to construct a target sub-image (Iv) corresponding to an arbitrary section of the wide-angle field of view and derived from adjacent source images (I1, . . . . . Ii, Ij . . . , In) furnished by the system of n fixed real cameras, wherein said processing system is a digital system and further comprises:

a luminance equalizing system for overall equalizing of corresponding luminance levels of first and second portions (Ivi, Ivj) of a digital target image, where said first and second portions (Ivi, Ivj) are derived from two adjacent source images (Ii, Ij ), said luminance equalizing system including first and second luminance correction modules for overall applying to said corresponding luminance levels of the first and second portions first and second luminance correction laws (Gi, Gj), said correction laws being evaluated, respectively, from first and second sets (R,S) of corresponding luminance levels relating to first and second sub-sets of pixels selected respectively in said first and second portions for equalizing said corresponding luminance levels of said first and second sets (R,S) to the best possible extent in accordance with the relation Gi(R)=Gj(S).

19. A system as claimed in claim 18, which further comprises, for constructing the target image (Iv) in the image construction system (GVVB):

a control module controlling the mobile virtual camera (Cv) using 3 parameters:

1) varying the panoramic orientation (PAN), designated the azimuth angle, of its optical axis, corresponding to a variation in the orientation parallel to a horizontal plane of the optical axis passing through a fixed view point common to all of the fixed real cameras and the mobile virtual camera;

2) varying the orientation (TILT), designated the angle of sight, of its optical axis, always passing through the fixed view point, in a vertical plane; and 3) varying the focal length of the virtual camera to furnish a more or less enlarged target image.

* * * * *